Oct. 18, 1960 R. H. BARTON 2,957,050
AMPLIFIER OSCILLATOR FOR MAGNETIC RECORDER-REPRODUCER
Filed Dec. 30, 1954
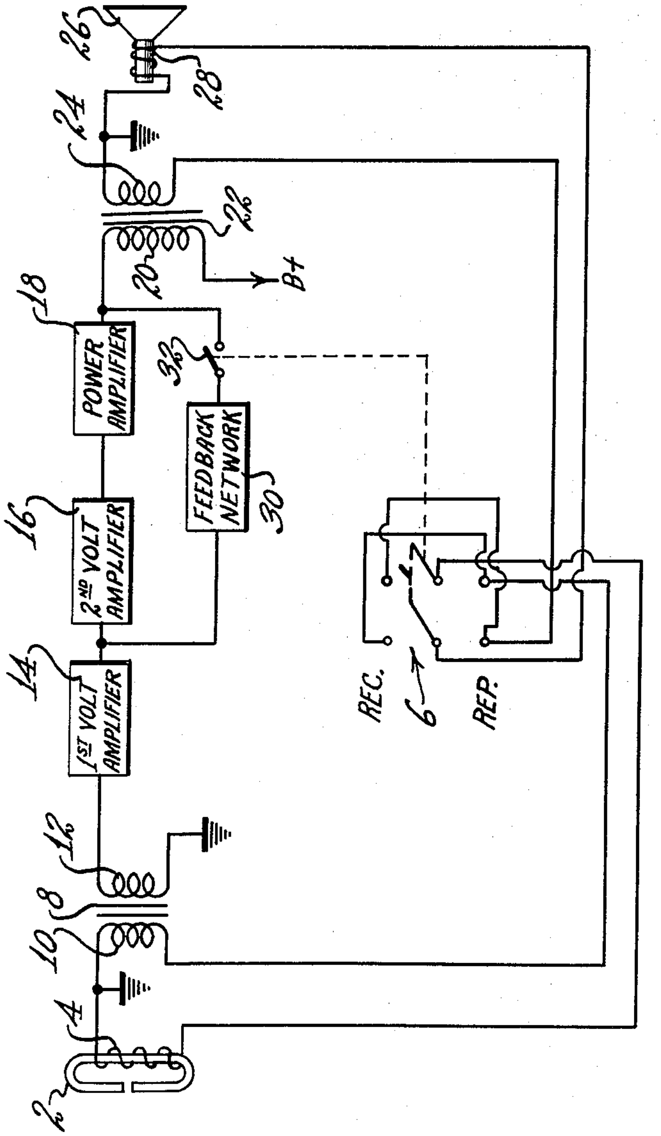
INVENTOR.
ROBERT H. BARTON
BY Morris Rabin
ATTORNEY United States Patent Office
2,957,050
Patented Oct. 18, 1960

2,957,050

AMPLIFIER OSCILLATOR FOR MAGNETIC RECORDER-REPRODUCER

Robert H. Barton, West Orange, N.J., assignor to Radio Corporation of America, a corporation of Delaware Filed Dec. 30, 1954, Ser. No. 478,658

4 Claims. (Cl. 179—100.2)

This invention relates to magnetic recording and more particularly to a magnetic recording-reproducing system wherein the recording bias is supplied by the recording amplifier.

In the art of magnetically recording intelligence signals on a magnetizable record member, it has been found advantageous to superimpose a high frequency oscillatory bias signal on the intelligence signal during the recording process. Such oscillatory bias signal assists, in a manner now well known in the art, in effecting the desired magnetization of the record member. Heretofore, such bias voltage has been supplied by oscillatory circuits separate from the recording amplifier.

It is an object of the present invention to provide an improved magnetic recording and reproducing system wherein, during the recording operation, the bias signal is developed within the amplifier and superimposed upon the intelligence signal.

It is another object of the present invention to provide a magnetic recording and reproducing system as set forth wherein the recording amplifier is caused to oscillate at a super-audible frequency.

In accomplishing these and other objects, there has been provided, in accordance with the present invention, a magnetic recording-reproducing system, wherein during the recording operations a positive feedback network couples the output of a record amplifier to the input thereof causing the amplifier to break into high frequency oscillations. The oscillations will be superimposed upon the intelligence signal which may then be applied by a suitable transducer to a magnetizable record member.

A better understanding of this invention may be had from the following description when read in connection with the single figure of the drawing which is a schematic representation of a magnetic recording and reproducing system embodying the present invention.

Referring now to the drawing in more detail, there is shown a magnetic record transducer 2 having a signal winding 4 thereon. One terminal of the signal winding 4 is connected to ground while the other terminal is connected to a reversing switch 6. An input transformer 8 has one terminal of its primary 10 connected to ground while the other terminal is connected to one of the terminals of the reversing switch 6. The secondary 12 of the transformer 8 is coupled to a first amplifier 14 thence to a second amplifier 16. The output of the second amplifier 16 is fed to an output power amplifier 18. Each of these amplifiers may be any one of a number of well known and suitable amplifiers. The output of the power amplifier 18 is coupled to the primary 20 of an output transformer 22. One terminal of the secondary 24 of the transformer 22 is connected to ground. The other terminal is connected to one of the terminals of the reversing switch 6. An acoustic transducer 26 may serve either as a loud-speaker or as a microphone. It carries a signal coil 28, one terminal of which is connected to ground while the other terminal is connected to the reversing switch 6.

The output circuit of the power amplifier is connected through a positive feedback network 30 to the input of the second amplifier. A switch 32 is connected in the feedback network and is ganged with the reversing switch 6. The operation of the reversing switch is such that the system may be conditioned for either recording or reproducing. Whenever the system is conditioned by the operation of the switch 6 for a recording operation, the acoustic transducer 26 is coupled by that switch 6 to the primary 10 of the input transformer 8. Similarly, the magnetic record transducer 2 is coupled through the switch 6 to the secondary of the output transformer 22. When the switch is closed in the record condition, the switch 32 is also closed. With the system in this condition, the application of intelligence signals to the acoustic transducer 26 produces corresponding electrical signals to be fed into the system of amplifiers. A portion of the amplified signal appearing in the output circuit of the power amplifier 18 is fed back in a positive feedback relationship to the input of the second voltage amplifier. In a manner well known in the art, the positive feedback causes the amplifier to break into oscillation. The frequency of the oscillation is determined in a manner well understood in the art by the time constants of the circuit elements. It is believed that these relationships are sufficiently well understood in the art that a further description thereof is unnecessary. It is believed sufficient to say that the circuit elements are so chosen that the frequency of the oscillations of the amplifier will fall within a range well beyond the range of frequencies which are audible. The intelligence signal will be amplified in the normal manner not withstanding the oscillations of the amplifier providing of course that the frequency of the oscillation is sufficiently high. Thus the oscillatory signal developed by the oscillating amplifier will be superimposed upon the intelligence signal and both signals will be simultaneously applied to the magnetic transducer 2. In this case, the oscillatory signal will serve as high frequency recording bias to assist in effecting recording of the intelligence signals on a suitable record member.

When the reversing switch 6 is operated in the opposite direction, the magnetic record transducer 2 is coupled by the switch to the primary of the input transformer while the acoustic transducer is coupled to the secondary of the output transformer, thus conditioning the system for the reproduction of signals recorded on a magnetic record member and detected by the magnetic record transducer. When the system is thus conditioned by the switch 6 for the reproduction of signals, the positive feedback network 30 is opened by operation of the switch 32 thus there would be no positive feedback during reproduction since there is no requirement for oscillatory bias voltage during the reproduction of the signals.

Thus there has been provided an improved magnetic recording system wherein a separate bias oscillator is unnecessary for the provision of high frequency recording bias, the bias voltage being developed within the amplifier, and which is characterized by a simplicity and economy of structure and operation.

What is claimed is:

1. A magnetic record translating system comprising, in combination, an amplifier having an input circuit and an output circuit, an acoustic transducer, a magnetic record transducer, switching means for selectively connecting said acoustic transducer in said input circuit and said magnetic record transducer in said output circuit in a first condition of said switching means and connecting said magnetic transducer in said input circuit and said acoustic transducer in said output circuit in a second condition of said switching means, said acoustic transducer being arranged to apply intelligence signals to said input circuit during said first condition switch means, and means including a positive feedback network coupling said output circuit to said input circuit operable during said first condition of said switching means to cause said amplifier to oscillate at a super-audible frequency wherein to superimpose an oscillatory recording bias voltage on said intelligence signal in said amplifier.

2. A magnetic record translating system comprising, in combination, an amplifier having an input circuit and an output circuit, an acoustic transducer, a magnetic record transducer, switching means, said switching being operable to condition said system to record intelligence signals, said acoustic transducer being coupled to said input circuit and said magnetic record transducer being coupled to said output circuit when said system is conditioned to record, said switching means being further operable to condition said system to reproduce intelligence signals, said magnetic record transducer being coupled to said input circuit and said acoustic transducer being coupled to said output circuit when said system is conditioned to reproduce, and means including a positive feedback network coupling said output circuit to said input circuit and operable when said system is conditioned to record to cause said amplifier to oscillate at a super-audible frequency whereby to superimpose an oscillatory recording bias voltage on said intelligence signal in said amplifier.

3. A magnetic recording and playback system comprising an amplifying stage including an input circuit and an output circuit, means to apply audio signals to be recorded to the input circuit of said stage, a sound reproducer, a magnetic transducer for pick-up and recording operation, and means including a selective switching device operative in one switching position to connect the output circuit of said stage to said transducer and simultaneously in positive feedback relation to said input circuit to render said stage oscillatory to produce a relatively high-frequency carrier and to superimpose said audio signals on said carrier for recording by said transducer, and operative in a second switching position to connect said transducer to said input circuit and simultaneously to connect said output circuit to said sound reproducer to play back recorded signals.

4. A magnetic recording and playback system comprising an amplifier stage including an electron discharge tube having an input electrode and an output electrode, and an input circuit coupled to said input electrode, and an output transformer having a primary winding coupled to said output electrode and a secondary winding, means to apply audio signals to be recorded to said input circuit, a sound reproducer, a magnetic transducer, a feedback circuit, and means including a selective switching element operative in one switching position to connect said secondary winding to said transducer and to connect simultaneously one of said windings through said circuit in positive feedback relation to said input circuit to render said amplifier stage oscillatory to produce a relatively high frequency carrier on which said audio signals are superimposed, and in a second switching position to connect said transducer to the input circuit of said amplifier and to connect the secondary winding to said reproducer.

References Cited in the file of this patent

UNITED STATES PATENTS

| | | |
|---|---|---|
| 2,540,299 | Shoup et al. | Feb. 6, 1951 |
| 2,654,003 | Dashiell | Sept. 29, 1953 |
| 2,698,882 | Payne et al. | Jan. 4, 1955 |

FOREIGN PATENTS

| | | |
|---|---|---|
| 880,550 | France | Jan. 4, 1943 |